United States Patent
Zhang et al.

(10) Patent No.: US 11,199,484 B2
(45) Date of Patent: Dec. 14, 2021

(54) DEVICE AND METHOD FOR TESTING WORKING PERFORMANCE OF ANCHOR ROD CABLE BY SIMULATING ROCK STRATUM FRACTURE AND SEPARATION ON BASIS OF ELECTROMAGNETIC ACTION

(71) Applicant: CHINA UNIVERSITY OF MINING AND TECHNOLOGY, Xuzhou (CN)

(72) Inventors: Nong Zhang, Xuzhou (CN); Zhengzheng Xie, Xuzhou (CN); Junyao Zhou, Xuzhou (CN); Yuxin Yuan, Xuzhou (CN); Xinyue Li, Xuzhou (CN)

(73) Assignee: China University of Mining and Technology, Jiangsu (CN)

( * ) Notice: Subject to any disclaimer, the term of this patent is extended or adjusted under 35 U.S.C. 154(b) by 330 days.

(21) Appl. No.: 16/487,425

(22) PCT Filed: Sep. 13, 2018

(86) PCT No.: PCT/CN2018/105354
§ 371 (c)(1),
(2) Date: Aug. 20, 2019

(87) PCT Pub. No.: WO2019/119899
PCT Pub. Date: Jun. 27, 2019

(65) Prior Publication Data
US 2021/0285857 A1   Sep. 16, 2021

(30) Foreign Application Priority Data

Dec. 18, 2017 (CN) .......................... 201711363794.8

(51) Int. Cl.
*G01N 3/10* (2006.01)

(52) U.S. Cl.
CPC .......... *G01N 3/10* (2013.01); *G01N 2203/005* (2013.01); *G01N 2203/0017* (2013.01);
(Continued)

(58) Field of Classification Search
CPC ............. G01N 3/10; G01N 2203/0017; G01N 2203/0048; G01N 2203/005; G01N 2203/0067
See application file for complete search history.

(56) References Cited

FOREIGN PATENT DOCUMENTS

| CN | 101762423 A | 6/2010 |
|---|---|---|
| CN | 101963555 A | 2/2011 |

(Continued)

OTHER PUBLICATIONS

International Search Report corresponding to International Application No. PCT/CN2018/105354 dated Dec. 17, 2018.

*Primary Examiner* — Jonathan M Dunlap
(74) *Attorney, Agent, or Firm* — Jenkins, Wilson, Taylor & Hunt, P.A.

(57) ABSTRACT

A device and method for testing the working performance of an anchor rod cable by simulating stratum fracture and separation on the basis of electromagnetic action, applicable to the technical field of testing working performance of anchor rod cables by simulating a tunnel field. The device comprises a top base (1) and a bottom base (2); a plurality of hydraulic vertical columns (3) are provided between the top base (1) and the bottom base (2); the plurality of hydraulic vertical columns (3) are provided thereon with clamping devices, and an electromagnetic block (9) is disposed between two groups of drawing block-shaped clamp holders (4). Using the attraction and repulsion forces of the electromagnetic block (9), the laminated electromagnetic block generates the separating or fracturing effect in a loading process so as to simulate the interaction between (Continued)

surrounding rock and an anchor rod cable test piece (8) in the field and accurately record various performance parameters of a working status of the anchor rod cable test piece (8), thereby providing positive guidance for directing field work.

5 Claims, 3 Drawing Sheets

(52) U.S. Cl.
      CPC ............... *G01N 2203/0048* (2013.01); *G01N 2203/0067* (2013.01)

(56) References Cited

FOREIGN PATENT DOCUMENTS

| | | | |
|---|---|---|---|
| CN | 104075943 | A | 10/2014 |
| CN | 206146749 | U | 5/2017 |
| CN | 107748064 | A * | 3/2018 |
| CN | 108106936 | A | 6/2018 |
| KR | 20170061414 | A | 6/2017 |

* cited by examiner

A-A

DEVICE AND METHOD FOR TESTING WORKING PERFORMANCE OF ANCHOR ROD CABLE BY SIMULATING ROCK STRATUM FRACTURE AND SEPARATION ON BASIS OF ELECTROMAGNETIC ACTION

I. TECHNICAL FIELD

The present invention relates to an anchor rod or cable operating performance testing device designed to simulate fracturation and bed separation based on electromagnetic action and a method thereof, and is particularly suitable for the technical field of testing the anchor rod or cable operating performance by simulating the roadway scene.

II. BACKGROUND ART

In deep mining of coal mine, because of the increase in crustal stress, the surrounding rocks of roadway are more prone to deformation. When the deformation of surrounding rocks exceeds the limit deformation capacity of the anchor rod or cable, the anchor rod or cable will break. At the same time, in the stope face, because the coal-rock mass is affected by strong mining action, it will experience big deformation, which will in turn cause a big deformation of the anchor rod or cable. When the amount of deformation exceeds the limit deformation capacity of the anchor rod or cable, the anchor rod or cable will break. The breakage of the anchor rod or cable may cause roof collapse or rock burst accident, resulting in casualties or mechanical equipment damage. The present invention provides an anchor rod or cable operating performance testing device under the action of dynamic load of bedded rock mass, simulating the interaction between surrounding rocks and the anchor rod or cable and monitoring the actual operating performance of the anchor rod or cable. The testing device has positive guiding significance for on-site construction.

The existing anchor rod or cable performance monitoring device only tests the material property of the anchor rod or cable, and cannot reflect characteristics of the basic performances of the anchor rod or cable in actual working state. In working state, the anchor rod or cable is not only subjected to the vertical stress of the overlying rock strata, but also to the horizontal stress of the surrounding rock mass. Therefore, the basic performances of the anchor rod or cable in working state are different from those in non-working state. As a result, the data obtained by simply testing the basic performances of the anchor rod or cable cannot completely guide the supporting work of the anchor rod or anchor cable on the site, so the roof safety accident caused by breakage of the anchor rod or cable will occur due to inaccurate performance monitoring of the anchor rod or cable.

With the development of deep mining and large-scale mechanized mining, the crustal stress and the disturbance of surrounding rocks will gradually increase during the process of coal mining. Therefore, in order to better guide the on-site engineering practice, it is necessary to accurately grasp the operating performances of the anchor rod or cable. At present, there is still lack of a monitoring device which can simulate the interaction between the surrounding rocks and the anchor rod or cable on the site and monitor the operating performances of the anchor rod or cable in engineering practice. The existing monitoring devices can only simply test the basic performances of the anchor rod or cable in non-working state, and thus have no real practical significance for guiding the engineering practice on the site.

III. CONTENTS OF THE INVENTION

Technical Problem

In view of the inadequacies of the prior art, the present invention provides a testing device for testing anchor rod or cable operating performance under the action of dynamic load of bedded rock mass and a testing method thereof, featured by simple structure and convenient use, which can effectively test the characteristics of changes in performances of the anchor rod or cable in drawing state under the action of surrounding rocks in the sinking and driving engineering.

Technical Scheme

To achieve the above technical objective, the present invention provides a device for testing the operating performances of the anchor rod or cable under the action of dynamic load of bedded rock mass, which is designed to simulate fracturation and bed separation based on electromagnetic action, comprising a top seat and a base, wherein a plurality of hydraulic columns are arranged between the top seat and the base, and a clamping device is arranged on a plurality of hydraulic columns;

the clamping device comprises two sets of drawing block clamping bodies, wherein two sets of drawing block clamping bodies are respectively arranged on the hydraulic rods or the hydraulic cylinders of a plurality of hydraulic columns, and two sets of drawing block clamping bodies are arranged at upper and lower positions oppositely, the drawing block clamping bodies comprises multiple sets of clamping bodies, and the multiple sets of clamping bodies are used for clamping or loosening the anchor rod or cable under test, each set of clamping bodies comprises a front block clamping body and a rear block clamping body, the front block clamping body is provided with a block clamping body hydraulic cylinder which is connected with the rear block clamping body, the front block clamping body is slidably connected with the rear block clamping body, and a block clamping body sensor is arranged on the contact surface between the front block clamping body of each set of clamping bodies and the front block clamping body of other set of clamping bodies;

between two sets of drawing block clamping bodies, a bedded rock mass simulating device is configured at a position close to the underneath of the drawing block clamping body arranged at the hydraulic rod, the bedded rock mass simulating device comprises an electromagnet part, both sides of the electromagnet part are respectively provided with hydraulic pushing baffles, and each of the hydraulic pushing baffles is supported on the lateral hydraulic column by the baffle arranged at the bottom of an electromagnetic jack, the electromagnetic jack comprises an electromagnet hydraulic cylinder and a hydraulic supporting part, the electromagnet part comprises two sets of correspondingly arranged electromagnets, which include a terminal electromagnet and a front-end electromagnet, wherein the terminal electromagnet is fixed on a hydraulic column, and the front-end electromagnet is movably connected with the terminal electromagnet for facilitating free disassembly, an arc-shaped groove is arranged at the position where the inner angles of the front-end electromagnet and the terminal electromagnet contact with the anchor rod or cable test piece, a rubber elastic gasket is arranged in the arc-shaped groove, and a safety door is arranged between two front-end electromagnets, only when the safety door is opened, the electromagnet part can be taken out, the front-end electromagnet is composed of a plurality of rectangular electromagnetic blocks arranged side by side, the safety door is arranged on the outside of the plurality of electromagnetic blocks, the electromagnetic blocks are provided with a plurality of internal electromagnetic coils, the safety door is provided with an electromagnet door handle and a safety door valve, the safety door is a protective measure arranged at the front-end of the electromagnet part.

There are 4 to 6 rectangular electromagnetic blocks, the height of each electromagnetic block is 3 to 10 cm, and the total height of the rectangular electromagnetic blocks is 12 to 60 cm; the electromagnet blocks form an integral whole by using the magnetic force interaction.

The plurality of internal electromagnetic coils are wound around a cylindrical iron block and are integrally embedded in the electromagnetic blocks to form a whole.

The rubber elastic gasket has a thickness of 2 to 5 cm and is bonded on the inner wall of the quarter circle arc-shaped groove of the electromagnetic block, the circular aperture formed through combination of the arc-shaped grooves has a diameter of 10 to 50 mm, the rubber elastic gasket can effectively prevent direct rigid contact between the anchor rod or cable and the electromagnet part which will otherwise cause damage to the electromagnet block, the rubber elastic gasket is used to change rigid contact into elastic contact, reducing damage to the electromagnet when the anchor rod or cable is broken.

An anchor rod or cable operating performance testing method designed to simulate fracturation and bed separation based on electromagnetic action, comprising the following steps:

a. adjusting the hydraulic rod of a plurality of hydraulic columns to rise and driving the upper drawing clamping part to move, so that the positions of upper and lower drawing block clamping bodies are adapted to the length of the anchor rod or cable test piece and the extension of block clamping body hydraulic cylinder in the front-end block clamping body drives the terminal of the block clamping body to move upwards obliquely along the front-end block clamping body, thus opening the drawing block clamping body; putting the anchor rod or cable test piece into the opened drawing block clamping body, controlling the clamping body hydraulic cylinder in the drawing block clamping body to contract, so that the terminal of the block clamping body makes downward movement obliquely; closing the clamping part of the drawing block clamping part, so as to clamp and fasten the anchor rod or cable test piece;

b. opening the safety door valve, opening the safety door, adjusting the electromagnetic jacks on both sides to contract, installing the terminal electromagnet and the front-end electromagnet one after another horizontally around the anchor rod or cable test piece, respectively, so as to enwrap the anchor rod or cable test piece, while ensuring that the contact position between the terminal electromagnet, the front-end electromagnet and the anchor rod or cable test piece is located at the rubber elastic gasket;

c. after the electromagnet part has been installed horizontally, closing the safety door part and fixing the safety door valve;

d. pushing the electromagnetic jack to drive the hydraulic pushing baffle, applying horizontal stress to the anchor rod or cable test piece by using the horizontally installed electromagnet part as a whole, so as to simulate the fastening interaction between surrounding rocks and the anchor rod or cable test piece;

e. controlling the hydraulic rods of a plurality of hydraulic columns to rise, so as to apply drawing force to the anchor rod or cable test piece fixed in the drawing block clamping body, and at the same time monitoring the stress variation in the anchor rod or cable test piece by using the block clamping body sensors on the drawing block clamping body;

f. according to the need, reversing the current of internal electromagnetic coils in any electromagnetic block, so as to generate an opposite force, so that the electromagnet part at designated position where the electromagnetic block generating reverse current is located can simulate the bed separation phenomenon caused under the dynamic load of bedded rock mass;

g. continuously monitoring the stress variation in the anchor rod or cable test piece, and recording the changes in the mechanical data of the anchor rod or cable test piece when bed separation phenomenon occurs under the dynamic load of bedded rock mass;

h. after the completion of observation, controlling power off of electromagnetic block, simultaneously controlling the hydraulic rods of a plurality of hydraulic columns to reset, controlling the contraction of electromagnetic jack, opening the safety door valve, using the electromagnet door handle to open the safety door part, removing the electromagnet part, opening the drawing block clamping body, and taking out the anchor rod or cable test piece.

Beneficial Effects (1) According to the present invention, the electromagnetic force of electromagnetic blocks is directly used to simulate the interaction between the surrounding rocks and the anchor rod or cable test piece on the site, various performance parameters of the anchor rod or cable test piece in operating state are accurately recorded through the monitoring part. The testing device has high precision and has positive guiding significance for field work.

(2) The horizontal stress of the present invention can be adjusted by using the hydraulic power part to push the pushing baffle, so that both vertical stress and horizontal stress act on the anchor rod or cable material, as comply with the real operating state of anchor rod or cable.

(3) The design of the presents invention uses a safety guard door and a safety door valve to completely close the broken part of the anchor rod or cable test piece in a separate area, thus improving the safety of the equipment and instruments and experimental operators;

(4) The present invention includes multiple sets of plate-shaped electromagnetic monomers, and each set of electromagnetic monomers is used to simulate a layer of rock stratum. Through the electromagnetic attraction and repulsion between electromagnetic monomers, the electromagnetic block part generates bed separation under dynamic load at a certain point to simulate the bed separation phenomenon in the rock stratum structure on the site. The present invention is featured by easy disassembly and assembly, simple structure and convenient operation.

IV. DESCRIPTION OF DRAWINGS

In the figures: 1—top seat; 2—base; 3—hydraulic column; 4 drawing block clamping body; 4-1 front-end block clamping body; 4-2 terminal block clamping body; 4-3 hydraulic cylinder of block clamping body; 4-4 induction part of block clamping body; 5—hydraulic supporting part; 6—electromagnet hydraulic cylinder; 7—elelectromagnet part; 7-1 terminal electromagnet; 7-2 front-end electromagnet; 7-3 safety door; 8—anchor rod or cable test piece; 9—electromagnetic block; 10—internal electromagnetic coil; 11—electromagnet door handle; 12—rubber elastic gasket; 13—safety door valve; 14—hydraulic pushing baffle.

V. EMBODIMENTS

Figure 1:
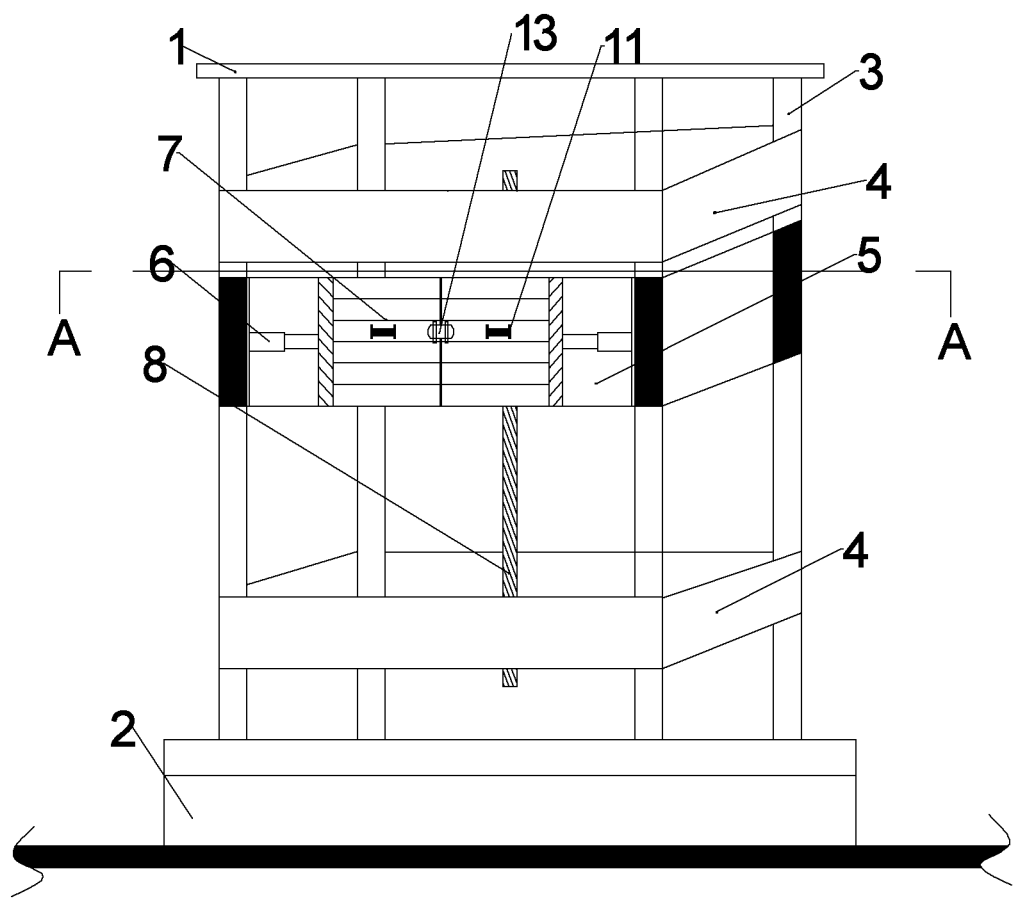
FIG. 1 is the structural schematic diagram of the device designed to test the performances of anchor rod or cable under the dynamic load action of bedded rock mass, according to the present invention.
Figure 2:
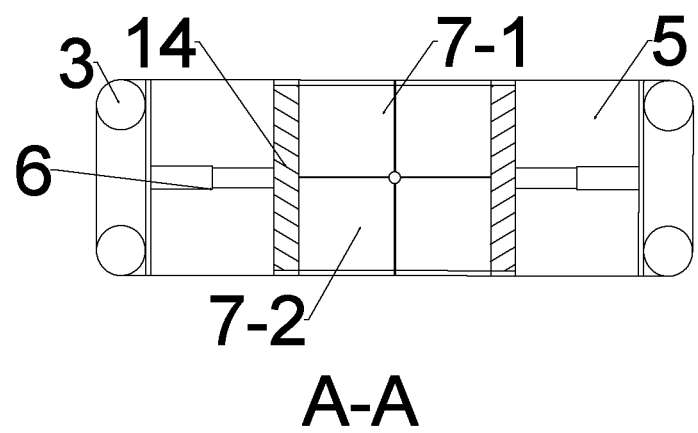
FIG. 2 is the structural A-A sectional view of the device designed to test the performances of anchor rod or cable under the dynamic load action of bedded rock mass, according to the present invention.
Figure 3:
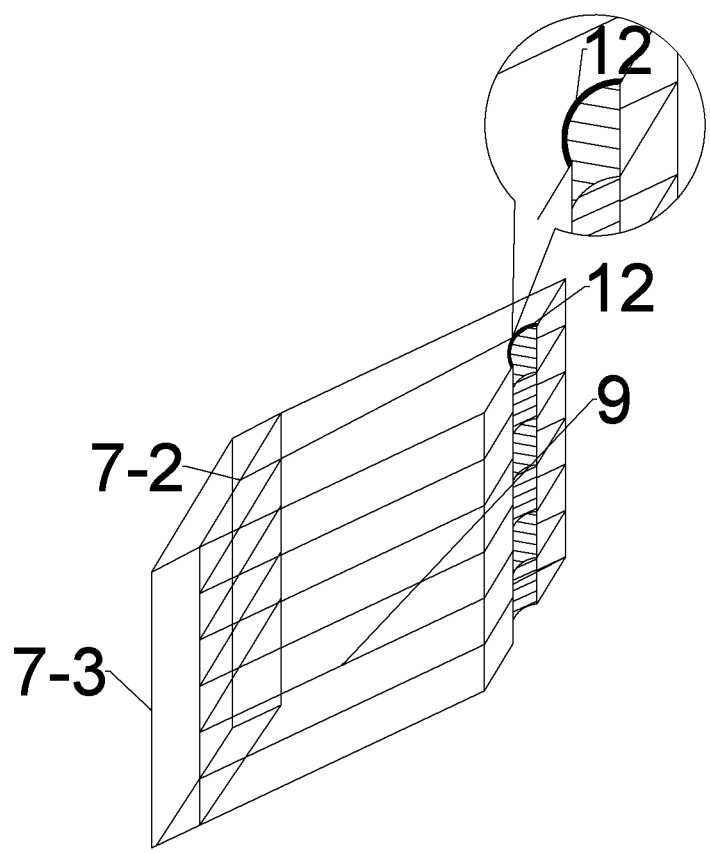
FIG. 3 is the schematic diagram for the electromagnet part of the device designed to test the performances of anchor rod or cable under the dynamic load action of bedded rock mass, according to the present invention.
Figure 4:
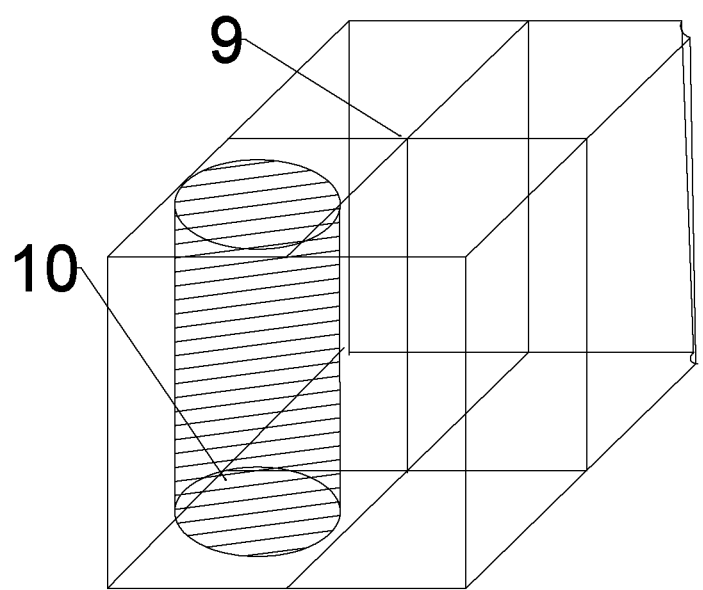
FIG. 4 is the schematic diagram for the electromagnetic block of the device designed to test the performances of anchor rod or cable under the dynamic load action of bedded rock mass, according to the present invention.
Figure 5:
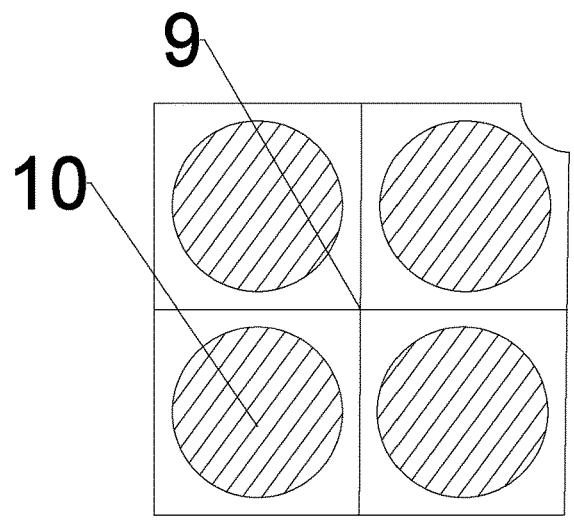
FIG. 5 is the schematic diagram for the internal electromagnetic coil in the electromagnetic block of the device designed to test the performances of anchor rod or cable under the dynamic load action of bedded rock mass, according to the present invention.
Figure 6:
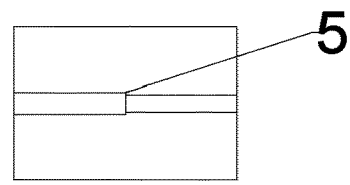
FIG. 6 is the schematic diagram for the electromagnet hydraulic cylinder part of the device designed to test the performances of anchor rod or cable under the dynamic load action of bedded rock mass, according to the present invention.
Figure 7:
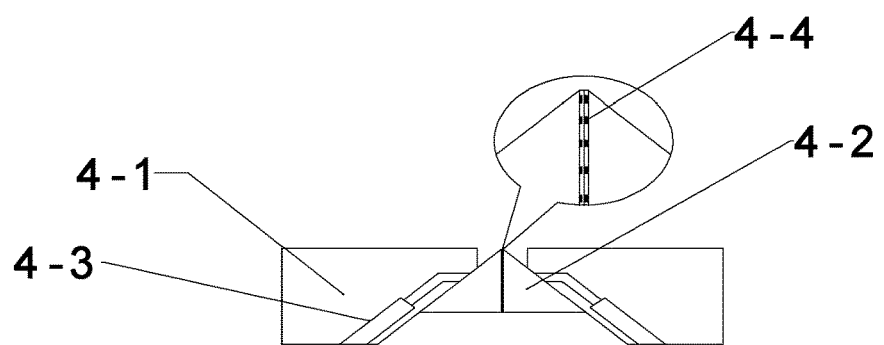
FIG. 7 is the schematic diagram for the drawing block clamping body part of the device designed to test the performances of anchor rod or cable under the dynamic load action of bedded rock mass, according to the present invention.

The specific implementation steps of the present invention are described below in combination with the attached drawings:

As shown in FIG. 1, the present invention provides an anchor rod or cable operating performance testing device designed to simulate fracturation and bed separation based on electromagnetic action, comprising a top seat 1 and a base 2, with a plurality of hydraulic columns 3 being arranged between the top seat 1 and the base 2, and a clamping device being arranged on a plurality of hydraulic columns 3;

The clamping device comprises two sets of drawing block clamping bodies 4, wherein two sets of drawing block clamping bodies 4 are respectively arranged on the hydraulic rods or the hydraulic cylinders of a plurality of hydraulic columns 3, and two sets of drawing block clamping bodies 4 are arranged at upper and lower positions oppositely, the drawing block clamping bodies 4 comprises multiple sets of clamping bodies, and the multiple sets of clamping bodies are used for clamping or loosening the anchor rod or cable under test, each set of clamping bodies comprises a front block clamping body 4-1 and a rear block clamping body 4-2, the front block clamping body 4-1 is provided with a block clamping body hydraulic cylinder 4-3 which is connected with the rear block clamping body 4-2, the front block clamping body 4-1 is slidably connected with the rear block clamping body 4-2, and a block clamping body sensor 4-4 is arranged on the contact surface between the front block clamping body 4-1 of each set of clamping bodies and the front block clamping body 4-1 of other set of clamping bodies;

Between two sets of drawing block clamping bodies 4, a bedded rock mass simulating device is configured at a position close to the underneath of the drawing block clamping body 4 arranged at the hydraulic rod, the bedded rock mass simulating device comprises an electromagnet part 7, both sides of the electromagnet part 7 are respectively provided with hydraulic pushing baffles 14, and each of the hydraulic pushing baffles 14 is supported on the lateral hydraulic column 3 by the baffle arranged at the bottom of an electromagnetic jack, the electromagnetic jack comprises an electromagnet hydraulic cylinder 6 and a hydraulic supporting part 5, the electromagnet part 7 comprises two sets of correspondingly arranged electromagnets, which include a terminal electromagnet 7-1 and a front-end electromagnet 7-2, wherein the terminal electromagnet 7-1 is fixed on a hydraulic column 3, and the front-end electromagnet 7-2 is movably connected with the terminal electromagnet 7-1 for facilitating free disassembly, an arc-shaped groove is arranged at the position where the inner angles of the front-end electromagnet 7-2 and the terminal electromagnet 7-1 contact with the anchor rod or cable test piece 8, a rubber elastic gasket 12 is arranged in the arc-shaped groove, the rubber elastic gasket 12 has a thickness of 2 to 5 cm and is bonded on the inner wall of the quarter circle arc-shaped groove of the electromagnetic block 9, the circular aperture formed through combination of the arc-shaped grooves has a diameter of 10 to 50 mm, the rubber elastic gasket 12 can effectively prevent direct rigid contact between the anchor rod or cable and the electromagnet part 7 which will otherwise cause damage to the electromagnet block, the rubber elastic gasket 12 is used to change rigid contact into elastic contact, reducing damage to the electromagnet when the anchor rod or cable is broken, and a safety door 7-3 is arranged between two front-end electromagnets 7-2, only when the safety door 7-3 is opened, the electromagnet part 7 can be taken out, the front-end electromagnet 7-2 is composed of a plurality of rectangular electromagnetic blocks 9 arranged side by side, there are 4 to 6 rectangular electromagnetic blocks 9, the height of each electromagnetic block 9 is 3 to 10 cm, and the total height of the rectangular electromagnetic blocks is 12 to 60 cm; the electromagnet blocks 9 form an integral whole by using the magnetic force interaction, the safety door 7-3 is arranged on the outside of the plurality of electromagnetic blocks 9, the electromagnetic blocks 9 are provided with a plurality of internal electromagnetic coils 10, the plurality of internal electromagnetic coils 10 are wound around a cylindrical iron block and are integrally embedded in the electromagnetic blocks 9 to form a whole, the safety door 7-3 is provided with an electromagnet door handle 11 and a safety door valve 13, the safety door 7-3 is a protective measure arranged at the front-end of the electromagnet part 7.

An anchor rod or cable operating performance testing method designed to simulate fracturation and bed separation based on electromagnetic action, comprising the following steps:

a. adjusting the hydraulic rod of a plurality of hydraulic columns 3 to rise and driving the upper drawing clamping part 4 to move, so that the positions of upper and lower drawing block clamping bodies 4 are adapted to the length of the anchor rod or cable test piece 8 and the extension of block clamping body hydraulic cylinder 4-3 in the front-end block clamping body 4-1 drives the terminal of the block clamping body 4-2 to move upwards obliquely along the front-end block clamping body 4-1, thus opening the drawing block clamping body 4; putting the anchor rod or cable test piece 8 into the opened drawing block clamping body 4, controlling the clamping body hydraulic cylinder 4-3 in the drawing block clamping body 4 to contract, so that the terminal of the block clamping body 4-2 makes downward movement obliquely; closing the clamping part of the drawing block clamping part 4, so as to clamp and fasten the anchor rod or cable test piece 8;

b. opening the safety door valve 13, opening the safety door 7-3, adjusting the electromagnetic jacks on both sides to contract, installing the terminal electromagnet 7-1 and the front-end electromagnet 7-2 one after another horizontally around the anchor rod or cable test piece 8, respectively, so as to enwrap the anchor rod or cable test piece 8, while ensuring that the contact position between the terminal electromagnet 7-1, the front-end electromagnet 7-2 and the anchor rod or cable test piece 8 is located at the rubber elastic gasket 12;

c. after the electromagnet part 7 has been installed horizontally, closing the safety door part 7-3 and fixing the safety door valve 13;

d. pushing the electromagnetic jack to drive the hydraulic pushing baffle 14, applying horizontal stress to the anchor rod or cable test piece 8 by using the horizontally installed electromagnet part 7 as a whole, so as to simulate the fastening interaction between surrounding rocks and the anchor rod or cable test piece 8;

e. controlling the hydraulic rods of a plurality of hydraulic columns 3 to rise, so as to apply drawing force to the anchor rod or cable test piece 8 fixed in the drawing block clamping body 4, and at the same time monitoring the stress variation in the anchor rod or cable test piece 8 by using the block clamping body sensors 4-4 on the drawing block clamping body 4;

f. according to the need, reversing the current of internal electromagnetic coils 10 in any electromagnetic block 9, so as to generate an opposite force, so that the electromagnet part 7 at designated position where the electromagnetic block 9 generating reverse current is located can simulate the bed separation phenomenon caused under the dynamic load of bedded rock mass;

g. continuously monitoring the stress variation in the anchor rod or cable test piece 8, and recording the changes in the mechanical data of the anchor rod or cable test piece 8 when bed separation phenomenon occurs under the dynamic load of bedded rock mass;

h. after the completion of observation, controlling power off of electromagnetic block 9, simultaneously controlling the hydraulic rods of a plurality of hydraulic columns 3 to reset, controlling the contraction of electromagnetic jack, opening the safety door valve 13, using the electromagnet door handle 11 to open the safety door part 7-3, removing the electromagnet part 7, opening the drawing block clamping body 4, and taking out the anchor rod or cable test piece 8.

The invention claimed is:

1. An anchor rod or cable operating performance testing device designed to simulate fracturation and bed separation based on electromagnetic action, comprising a top seat and a base, with a plurality of hydraulic columns being arranged between the top seat and the base, and a clamping device being arranged on a plurality of hydraulic columns, characterized in that:

the clamping device comprises two sets of drawing block clamping bodies, wherein two sets of drawing block clamping bodies are respectively arranged on the hydraulic rods or the hydraulic cylinders of a plurality of hydraulic columns, and two sets of drawing block clamping bodies are arranged at upper and lower positions oppositely, the drawing block clamping bodies comprises multiple sets of clamping bodies, and the multiple sets of clamping bodies are used for clamping or loosening the anchor rod or cable under test, each set of clamping bodies comprises a front block clamping body and a rear block clamping body, the front block clamping body is provided with a block clamping body hydraulic cylinder which is connected with the rear block clamping body, the front block clamping body is slidably connected with the rear block clamping body, and a block clamping body sensor is arranged on the contact surface between the front block clamping body of each set of clamping bodies and the front block clamping body of other set of clamping bodies;

between two sets of drawing block clamping bodies, a bedded rock mass simulating device is configured at a position close to the underneath of the drawing block clamping body arranged at the hydraulic rod, the bedded rock mass simulating device comprises an electromagnet part, both sides of the electromagnet part are respectively provided with hydraulic pushing baffles, and each of the hydraulic pushing baffles is supported on the lateral hydraulic column by the baffle arranged at the bottom of an electromagnetic jack, the electromagnetic jack comprises an electromagnet hydraulic cylinder and a hydraulic supporting part, the electromagnet part comprises two sets of correspondingly arranged electromagnets, which include a terminal electromagnet and a front-end electromagnet, wherein the terminal electromagnet is fixed on a hydraulic column, and the front-end electromagnet is movably connected with the terminal electromagnet for facilitating free disassembly, an arc-shaped groove is arranged at the position where the inner angles of the front-end electromagnet and the terminal electromagnet contact with the anchor rod or cable test piece, a rubber elastic gasket is arranged in the arc-shaped groove, and a safety door is arranged between two front-end electromagnets, only when the safety door is opened, the electromagnet part can be taken out, the front-end electromagnet is composed of a plurality of rectangular electromagnetic blocks arranged side by side, the safety door is arranged on the outside of the plurality of electromagnetic blocks, the electromagnetic blocks are provided with a plurality of internal electromagnetic coils, the safety door is provided with an electromagnet door handle and a safety door valve, the safety door is a protective measure arranged at the front-end of the electromagnet part.

2. The anchor rod or cable operating performance testing device designed to simulate fracturation and bed separation based on electromagnetic action according to claim 1, characterized in that, there are 4 to 6 rectangular electromagnetic blocks, the height of each electromagnetic block is 3 to 10 cm, and the total height of the rectangular electromagnetic blocks is 12 to 60 cm; the electromagnet blocks form an integral whole by using the magnetic force interaction.

3. The anchor rod or cable operating performance testing device designed to simulate fracturation and bed separation based on electromagnetic action according to claim 1, characterized in that, the plurality of internal electromagnetic coils are wound around a cylindrical iron block and are integrally embedded in the electromagnetic blocks to form a whole.

4. The anchor rod or cable operating performance testing device designed to simulate fracturation and bed separation based on electromagnetic action according to claim 1, characterized in that, the rubber elastic gasket has a thickness of 2 to 5 cm and is bonded on the inner wall of the quarter circle arc-shaped groove of the electromagnetic block, the circular aperture formed through combination of the arc-shaped grooves has a diameter of 10 to 50 mm, the rubber elastic gasket can effectively prevent direct rigid contact between the anchor rod or cable and the electromagnet part which will otherwise cause damage to the electromagnet block, the rubber elastic gasket is used to change rigid contact into elastic contact, reducing damage to the electromagnet when the anchor rod or cable is broken.

5. A testing method utilizing the anchor rod or cable operating performance testing device designed to simulate fracturation and bed separation based on electromagnetic action of claim 1, comprising the following steps:

a. adjusting the hydraulic rod of a plurality of hydraulic columns to rise and driving the upper drawing clamping part to move, so that the positions of upper and lower drawing block clamping bodies are adapted to the length of the anchor rod or cable test piece and the extension of block clamping body hydraulic cylinder in the front-end block clamping body drives the terminal of the block clamping body to move upwards obliquely along the front-end block clamping body, thus opening the drawing block clamping body; putting the anchor rod or cable test piece into the opened drawing block clamping body, controlling the clamping body hydraulic cylinder in the drawing block clamping body to contract, so that the terminal of the block clamping body makes downward movement obliquely; closing the clamping part of the drawing block clamping part, so as to clamp and fasten the anchor rod or cable test piece;

b. opening the safety door valve, opening the safety door, adjusting the electromagnetic jacks on both sides to contract, installing the terminal electromagnet and the front-end electromagnet one after another horizontally around the anchor rod or cable test piece, respectively, so as to enwrap the anchor rod or cable test piece, while ensuring that the contact position between the terminal electromagnet, the front-end electromagnet and the anchor rod or cable test piece is located at the rubber elastic gasket;

c. after the electromagnet part has been installed horizontally, closing the safety door part and fixing the safety door valve;

d. pushing the electromagnetic jack to drive the hydraulic pushing baffle, applying horizontal stress to the anchor rod or cable test piece by using the horizontally installed electromagnet part as a whole, so as to simulate the fastening interaction between surrounding rocks and the anchor rod or cable test piece;

e. controlling the hydraulic rods of a plurality of hydraulic columns to rise, so as to apply drawing force to the anchor rod or cable test piece fixed in the drawing block clamping body, and at the same time monitoring the stress variation in the anchor rod or cable test piece by using the block clamping body sensors on the drawing block clamping body;

f. according to the need, reversing the current of internal electromagnetic coils in any electromagnetic block, so as to generate an opposite force, so that the electromagnet part at designated position where the electromagnetic block generating reverse current is located can simulate the bed separation phenomenon caused under the dynamic load of bedded rock mass;

g. continuously monitoring the stress variation in the anchor rod or cable test piece, and recording the changes in the mechanical data of the anchor rod or cable test piece when bed separation phenomenon occurs under the dynamic load of bedded rock mass;

h. after the completion of observation, controlling power off of electromagnetic block, simultaneously controlling the hydraulic rods of a plurality of hydraulic columns to reset, controlling the contraction of electromagnetic jack, opening the safety door valve, using the electromagnet door handle to open the safety door part, removing the electromagnet part, opening the drawing block clamping body, and taking out the anchor rod or cable test piece.

* * * * *